US008618783B2

(12) United States Patent
Oki

(10) Patent No.: US 8,618,783 B2
(45) Date of Patent: Dec. 31, 2013

(54) DC-DC CONVERTER WITH ADAPTIVE PHASE COMPENSATION CONTROLLER

(75) Inventor: Hideta Oki, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 277 days.

(21) Appl. No.: 12/617,427

(22) Filed: Nov. 12, 2009

(65) Prior Publication Data

US 2010/0134081 A1 Jun. 3, 2010

(30) Foreign Application Priority Data

Nov. 28, 2008 (JP) .................................. 2008-305307

(51) Int. Cl.
*G05F 1/00* (2006.01)
*G05F 5/00* (2006.01)

(52) U.S. Cl.
USPC ........................ 323/285; 323/299; 323/222

(58) Field of Classification Search
USPC ......... 323/212, 213, 282, 284, 285, 351, 299, 323/222
See application file for complete search history.

(56) References Cited

U.S. PATENT DOCUMENTS

| | | | | |
|---|---|---|---|---|
| 5,850,139 | A * | 12/1998 | Edwards | 323/280 |
| 7,012,411 | B2 * | 3/2006 | Yasukouchi | 323/282 |
| 7,605,573 | B2 * | 10/2009 | Nishida | 323/282 |
| 7,759,912 | B2 * | 7/2010 | Weng et al. | 323/222 |
| 7,911,257 | B2 * | 3/2011 | Tsividis et al. | 327/356 |
| 7,960,947 | B2 * | 6/2011 | Chen et al. | 320/166 |
| 8,013,379 | B2 * | 9/2011 | Futatsugi | 257/312 |
| 2007/0090819 | A1 | 4/2007 | Hasegawa et al. | |
| 2009/0102444 | A1 * | 4/2009 | Nonaka | 323/282 |

FOREIGN PATENT DOCUMENTS

| | | | |
|---|---|---|---|
| JP | 11-187647 | | 7/1999 |
| JP | 02004120564 A | * | 4/2004 |
| JP | 2005-110468 A | | 4/2005 |
| JP | 2007-124748 | | 5/2007 |

OTHER PUBLICATIONS

Japanese Office Action dated Jan. 8, 2013 for corresponding Japanese Application No. 2008-305307.

* cited by examiner

*Primary Examiner* — Bao Q Vu
*Assistant Examiner* — Zekre Tsehaye
(74) *Attorney, Agent, or Firm* — Sterne, Kessler, Goldstein & Fox PLLC

(57) ABSTRACT

A DC-DC converter for generating an output voltage from input voltage, includes: an output stage for outputting the output voltage; an error amplifier having an input and a reference input for receiving a feedback voltage at the input in accordance with the output voltage and for receiving a reference voltage at the reference input, the error amplifier generating an amplified voltage for driving the output stage, the amplifier voltage corresponding to the difference between the feedback voltage and the reference voltage; a phase compensation unit for generating a phase compensation component to the feedback voltage; and a phase compensation controller for controlling the phase of the phase compensation unit; wherein the feedback voltage is determined by the output voltage plus said phase compensation component.

20 Claims, 9 Drawing Sheets

DC-DC CONVERTER WITH ADAPTIVE PHASE COMPENSATION CONTROLLER

CROSS-REFERENCE TO RELATED APPLICATION

This application is based upon and claims the benefit of priority of the prior Japanese Patent Application No. 2008-305307 filed on Nov. 28, 2008, the entire contents of which are incorporated herein by reference.

FIELD

The embodiments discussed herein are related to a DC-DC converter.

BACKGROUND

In the related art, electronic devices include an internal circuit that performs signal processing and a DC-DC converter that supplies an output voltage as a power voltage to the internal circuit. The DC-DC converter generates an output voltage to be supplied to the internal circuit from an input voltage and performs control so that the output voltage is constant. In order to perform the control so that the output voltage is constant, the DC-DC converter performs feedback control.

However, in the DC-DC converter, there is a problem in terms of stability in a control system (feedback loop) that controls the feedback control due to frequency characteristics of elements that form the feedback loop. For example, in the DC-DC converter, the output voltage undesirably oscillates due to a drastic change in the output voltage. Therefore, an error amplifier that constitutes the DC-DC converter is normally equipped with a phase compensation unit between an output terminal and a negative input terminal thereof so as to maintain the stability of the output voltage.

Regarding a constant (phase compensation constant) of this phase compensation unit, an optimal phase compensation constant varies depending on the conditions of the input voltage and the output voltage of the DC-DC converter (input/output conditions). Therefore, the DC-DC converter selects one phase compensation constant within a limited range of input/output conditions so as to stably generate an output voltage. Consequently, the DC-DC converter is problematic in that it cannot select an optimal phase compensation constant within the entire range of input/output conditions.

As a countermeasure against this problem, the DC-DC converter of the related art is provided with a plurality of different phase compensation constants and switches the phase compensation constants in accordance with the input-output conditions (see Japanese Patent Application Laid-open No. 2005-110468). Thus, the DC-DC converter can select an optimal phase compensation constant with respect to the input/output conditions corresponding to the phase compensation constants provided therein.

SUMMARY

According to an aspect of the embodiment, a DC-DC converter for generating an output voltage from an input voltage, includes: an output stage for outputting the output voltage; an error amplifier having an input and a reference input for receiving a feedback voltage at the input in accordance with the output voltage and for receiving a reference voltage at the reference input, the error amplifier generating an amplified voltage for driving the output stage, the amplifier voltage corresponding to the difference between the feedback voltage and the reference voltage; a phase compensation unit for generating a phase compensation component to the feedback voltage; and a phase compensation controller for controlling the phase of the phase compensation unit; wherein the feedback voltage is determined by the output voltage plus said phase compensation component.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
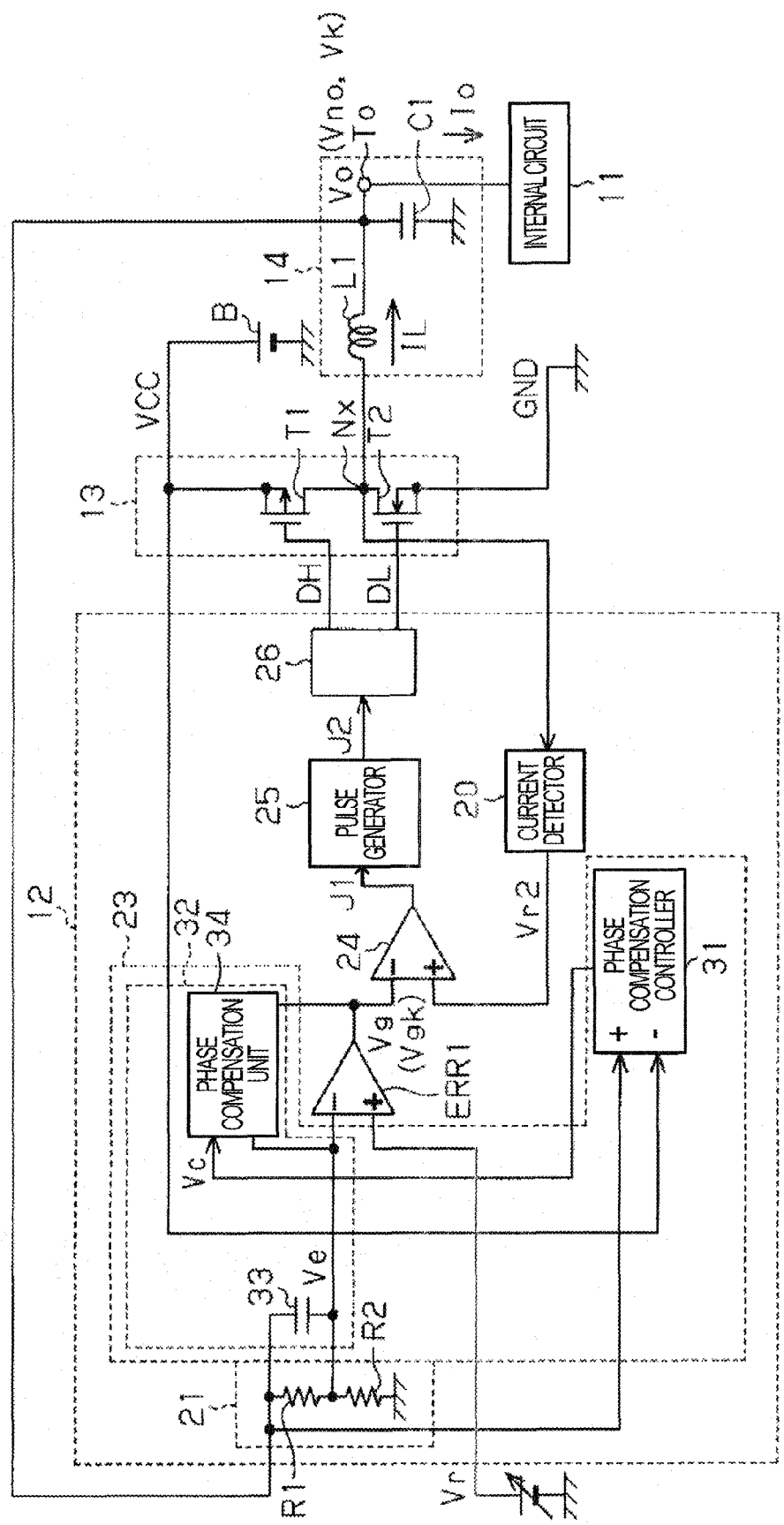
FIG. 1 illustrates an electric block circuit diagram of a DC-DC converter according to a first embodiment.

As illustrated in FIG. 1, a DC-DC converter 10 step-down converts an input voltage VCC from an input power source B so as to generate an output voltage Vo at an output terminal To, and outputs the generated output voltage Vo from the output terminal To to an internal circuit 11. The DC-DC converter 10 is a current-control-type DC-DC converter that performs current control operation by which the output voltage Vo is controlled to a preset target voltage Vk and output to the internal circuit 11. The DC-DC converter 10 includes a control circuit 12, a switching circuit 13, and a first smoothing circuit 14.

The control circuit 12 generates the output voltage Vo by performing duty control in accordance with the load state of the internal circuit 11. The output voltage Vo generated as the result of the duty control is smoothed by the first smoothing circuit 14 constituted by a choke coil L1 and a smoothing capacitor C1 and is output from the output terminal To to the internal circuit 11.

The control circuit 12 includes a current detector 20, a voltage divider circuit 21, an error amplifier ERR1, a phase compensator 23, a current comparator 24, a pulse generator 25, and a feed-through prevention circuit 26.

The current detector 20 detects a current (coil current IL) flowing through the choke coil L1 of the first smoothing circuit 14 and outputs a load detection voltage Vr2 opposed to the coil current IL. The current detector 20 outputs the detected load detection voltage Vr2 to the current comparator 24.

The voltage divider circuit 21 is formed of a series circuit having a first resistor R1 and a second resistor R2, and the output voltage Vo to be supplied to the internal circuit 11 is applied as a feedback signal (feedback voltage) to the series circuit. The voltage divider circuit 21 outputs a voltage at the connection point of the first resistor R1 and the second resistor R2 as a divided voltage Ve to a negative input terminal serving as one of input terminals of the error amplifier ERR1 functioning as an error amplifier circuit.

The error amplifier ERR1 has the negative input and a positive input for receiving a feedback voltage at the negative input in accordance with the output voltage Vo and for receiving the reference voltage Vr at the positive input. The error amplifier generates an amplified voltage Vg for driving the output stage. The amplifier voltage Vg corresponds to the difference between the feedback voltage and the reference voltage Vr. Wherein, the feedback voltage is determined by the voltage proportional to the output voltage Vo plus the phase compensation component.

The error amplifier ERR1 receives the divided voltage Ve to the negative input. The error amplifier ERR1 generates the amplified voltage as an error voltage Vg from the output terminal To to the current comparator 24.

The resistance values of the first resistor R1 and the second resistor R2 are set such that, when the output voltage Vo to be applied to the voltage divider circuit 21 is equal to the preset target voltage Vk to be supplied to the internal circuit 11, the divided voltage Ve of the voltage divider circuit 21 is equal to the reference voltage Vr.

The error amplifier ERR1 outputs an error voltage Vgk, which is a preset voltage value, when the divided voltage Ve is equal to the reference voltage Vr, or, as the output voltage Vo becomes smaller relative to the target voltage Vk, the error amplifier ERR1 outputs, to the current comparator 24, an error voltage Vg that is opposed to the smallness and is a larger value relative to the error voltage Vgk, which is a preset voltage value. In contrast, as the output voltage Vo becomes larger relative to the target voltage Vk, the error amplifier ERR1 outputs, to the current comparator 24, an error voltage Vg that is opposed to the largeness and is a smaller value relative to the error voltage Vgk, which is a preset voltage value.

The current comparator 24 receives the error voltage Vg from the error amplifier ERR1 to a negative input terminal thereof, and receives the load detection voltage Vr2 from the current detector 20 to a positive input terminal thereof. The current comparator 24 outputs a first determination signal J1 at H level when the load detection voltage Vr2 is greater than or equal to the error voltage Vg, or, in contrast, outputs a first determination signal J1 at L level when the load detection voltage Vr2 is smaller than the error voltage Vg.

Specifically, when the output voltage Vo becomes lower than or equal to the target voltage Vk due to a certain reason, the output voltage Vo needs to be increased, and in order to achieve this increase, the coil current IL flowing through the choke coil L1 needs to be increased. In this case, the error voltage Vg to be input to the negative input terminal of the current comparator 24 increases with the output voltage and therefore exceeds the value of the load detection voltage Vr2. In contrast, when the output voltage Vo exceeds the target voltage Vk due to a certain reason, the output voltage Vo needs to be decreased, and in order to achieve this decrease, the coil current IL flowing through the choke coil L1 needs to be decreased. In this case, the error voltage Vg to be input to the negative input terminal of the current comparator 24 decreases with the output voltage Vo and therefore becomes lower than or equal to the value of the load detection voltage Vr2.

The current comparator 24 compares the error voltage Vg with the load detection voltage Vr2 and determines whether the output voltage Vo is lower than or equal to the target voltage Vk or, in contrast, below the target voltage Vk.

In other words, the current comparator 24 outputs the first determination signal J1 at H level when the output voltage Vo exceeds the target voltage Vk, or, in contrast, outputs the first determination signal J1 at L level when the output voltage Vo becomes lower than or equal to the target voltage Vk due to a certain reason.

The comparator 24 outputs the first determination signal J1 to an output stage. The output stage outputs the output voltage. The output stage has the pulse generator 25, the feed-through prevention circuit 26, the current detector 20, the switching circuit 13, and the first smoothing circuit 14.

The first determination signal J1 of the current comparator 24 is output to the pulse generator 25. The pulse generator 25 includes an RS flip-flop circuit and an oscillator circuit. The first determination signal J1 from the current comparator 24 is input to a set input terminal of the RS flip-flop circuit, and a clock signal from the oscillator circuit is input to a reset terminal of the RS flip-flop circuit.

When the RS flip-flop circuit receives, to the set input terminal thereof, the first determination signal J1 increased to H level, a second determination signal J2 at H level is output from a Q output terminal of the RS flip-flop circuit (output terminal of the pulse generator 25). When the RS flip-flop circuit receives a clock signal to the reset input terminal thereof from this state, the second determination signal J2 is inverted (reset) and output at L level from the Q output terminal (output terminal of the pulse generator 25).

Specifically, within one period of the clock signal, the pulse generator 25 outputs the second determination signal J2 at H level in response to the increase from the L level to the H level of the first determination signal J1, and outputs the second determination signal J2 at L level in response to the clock signal.

In other words, when the output voltage Vo exceeds the target voltage Vk within one period of the clock signal, the pulse generator 25 outputs the second determination signal J2 at H level, and subsequently outputs the second determination signal J2 at L level in response to the clock signal.

More specifically, when the output voltage Vo is a value close to the target voltage Vk, the output voltage Vo would exceed the target voltage Vk at a timing substantially corresponding to the midpoint between two clock signals. As a result, the duty ratio of the second determination signal J2 output from the pulse generator 25 substantially becomes 50%.

As the output voltage Vo becomes lower relative to the target voltage Vk, the output voltage exceeds the target voltage Vk at a timing earlier than the midpoint between two clock signals. As a result, the duty ratio of the second determination signal J2 output from the pulse generator 25 becomes 50% or greater.

Furthermore, as the output voltage Vo becomes higher relative to the target voltage Vk, the output voltage Vo exceeds the target voltage Vk at a timing later than the midpoint between two clock signals. As a result, the duty ratio of the second determination signal J2 output from the pulse generator 25 becomes lower than 50%.

Based on the output voltage Vo, the second determination signal J2 of the pulse generator 25, of which the duty ratio is to be changed, is output to the feed-through prevention circuit 26. Based on the second determination signal J2, the feed-through prevention circuit 26 outputs first and second drive signals DH and DL respectively to gates of a first transistor T1 serving as a main transistor and a second transistor T2 serving as a synchronization transistor, which constitute the switching circuit 13.

When the second determination signal J2 is at L level, the feed-through prevention circuit 26 outputs the first and second drive signals DH and DL at L level to the gates of the first and second transistors T1 and T2. In contrast, when the second determination signal J2 is at H level, the feed-through prevention circuit 26 outputs the first and second drive signals DH and DL at H level to the gates of the first and second transistors T1 and T2. Accordingly, the feed-through prevention circuit 26 outputs the first and second drive signals DH and DL with the same duty ratio as the second determination signal J2 to the first and second transistors T1 and T2, respectively.

The first transistor T1 is a P-channel MOS transistor that receives the first drive signal DH to the gate thereof and is supplied with the input voltage VCC to the source thereof. The drain of the first transistor T1 is connected to the drain of the second transistor T2.

The second transistor T2 is an N-channel MOS transistor that receives the second drive signal DL to the gate thereof. The source of the second transistor T2 is connected to ground GND. A connection point (node Nx) between the drain of the second transistor T2 and the drain of the first transistor T1 is connected to the output terminal To (internal circuit 11) via the choke coil L1 of the first smoothing circuit 14.

Upon receiving the first and second drive signals DH and DL at L level from the feed-through prevention circuit 26, the switching circuit 13 turns on the first transistor T1 and turns off the second transistor T2, whereas upon receiving the first and second drive signals DH and DL at H level from the feed-through prevention circuit 26, the switching circuit 13 turns off the first transistor T1 and turns on the second transistor T2. In other words, based on the second determination signal J2 (first and second drive signals DH and DL), the first transistor T1 and the second transistor T2 are complementarily turned on and off.

Based on the on/off operation (duty control) of the first transistor T1 and the second transistor T2, the switching circuit 13 outputs the input voltage VCC to the first smoothing circuit 14 where a smoothed output voltage Vo of the target voltage Vk is generated and supplied to the internal circuit 11 via the output terminal To.

Specifically, when an actual voltage of the output voltage Vo actually supplied to the internal circuit 11 is lower than or equal to the preset target voltage Vk to be supplied to the internal circuit 11, the feed-through prevention circuit 26 outputs the first and second drive signals DH and DL with a long L-level time period and causes the first transistor T1 to be turned on and the second transistor T2 to be turned off, whereby the output voltage Vo is increased to the target voltage Vk and supplied to the internal circuit 11.

In contrast, when the output voltage Vo actually supplied to the internal circuit 11 is higher than the preset target voltage Vk to be supplied to the internal circuit 11, the feed-through prevention circuit 26 outputs the first and second drive signals DH and DL with a long H-level time period and causes the first transistor T1 to be turned off and the second transistor T2 to be turned on, whereby the output voltage Vo is decreased to the target voltage Vk and supplied to the internal circuit 11.

As mentioned above, the control circuit 12 included in the DC-DC converter 10 is provided with the phase compensator 23. The phase compensator 23 is for preventing the output voltage Vo from oscillating in response to a drastic change in the output voltage Vo.

Figure 2:
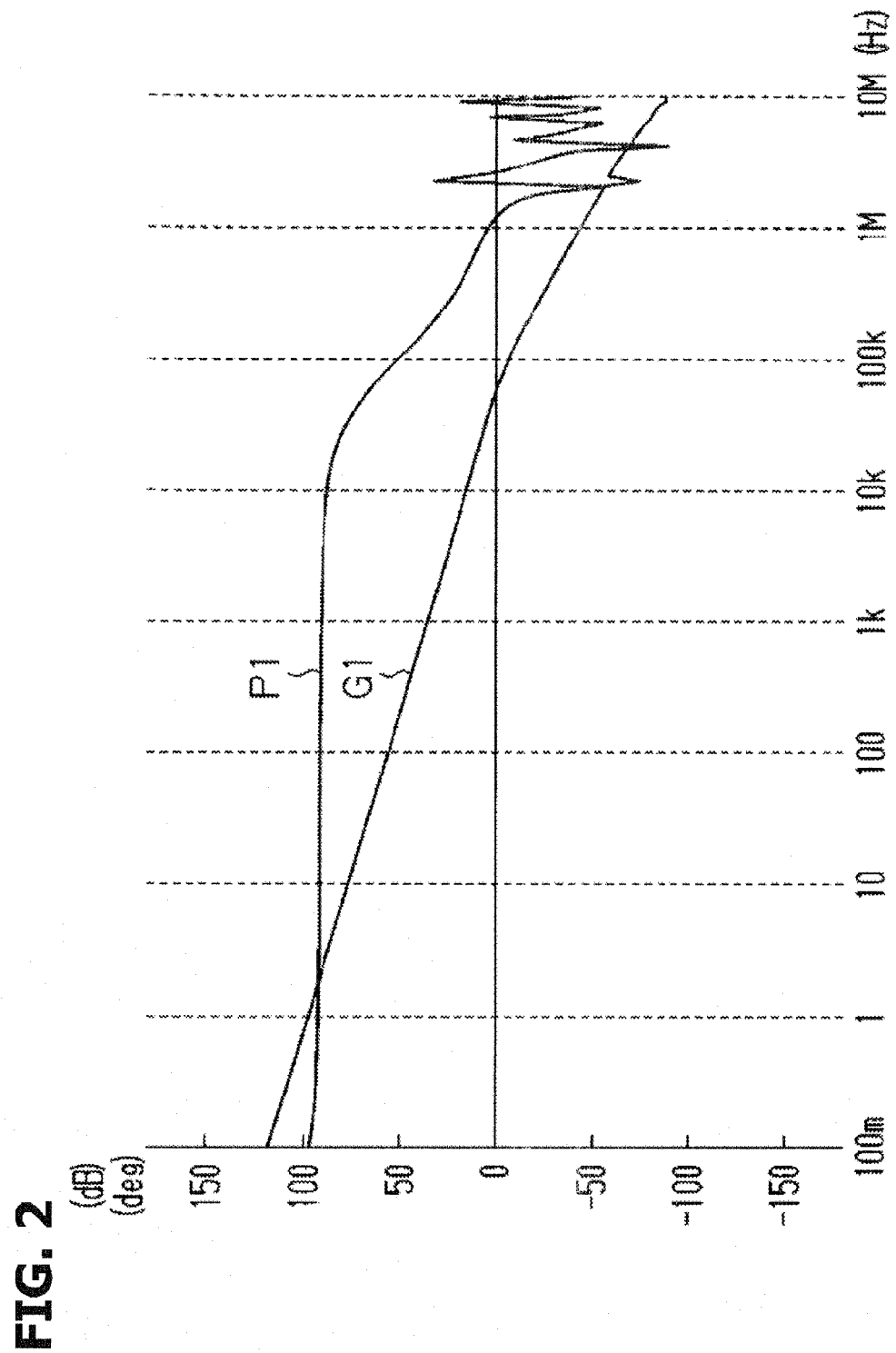
FIG. 2 illustrates an electric circuit diagram of a phase compensation unit according to the first embodiment.

FIG. 2 illustrates a simulation result of a frequency characteristic of a DC-DC converter of the related art not equipped with the phase compensator 23 and shows a gain characteristic line G1 [dB] and a phase characteristic line P1 [dB] of a feedback loop of the DC-DC converter. The term "frequency characteristic" in this case refers to a frequency range in which the gain of the DC-DC converter is greater than or equal to 0 dB. Specifically, a frequency characteristic expresses how much the DC-DC converter can still normally operate under a drastic change when the output voltage Vo changes drastically.

The following are input conditions for the simulation: input voltage VCC=3.3 V, output voltage Vo=2.47 V, output current Io to be supplied to the internal circuit 11=450 mA. The output current Io is a current obtained by smoothing the coil current IL at the capacitor C1 and to be supplied to the internal circuit 11. Therefore, the value of the output current Io is an average value of the coil current IL.

As illustrated in FIG. 2, the frequency range of the DC-DC converter of the related art is 50 kHz.

Consequently, the DC-DC converter of the related art not equipped with the phase compensator 23 has a narrow frequency range, thus oscillates easily, and therefore creates problems in achieving stable operation.

In light of this, in this embodiment, the control circuit 12 is provided with the phase compensator 23.

The phase compensator 23 includes a phase compensation controller 31 and a phase compensation unit 32, so that the error amplifier ERR1 outputs a stable error voltage Vg.

The phase compensation controller 31 controls the phase compensation unit 34. The phase compensation controller 31 is constituted by an error amplifier circuit. The phase compensation controller 31 receives the input voltage VCC to a negative input terminal thereof and receives the output voltage Vo as a feedback signal (feedback voltage) to a positive input terminal thereof. The phase compensation controller 31 amplifies a voltage difference between the input voltage VCC and the output voltage Vo and outputs the amplified voltage difference as a control voltage Vc acting as a control signal to the phase compensation unit 32.

Figure 3:
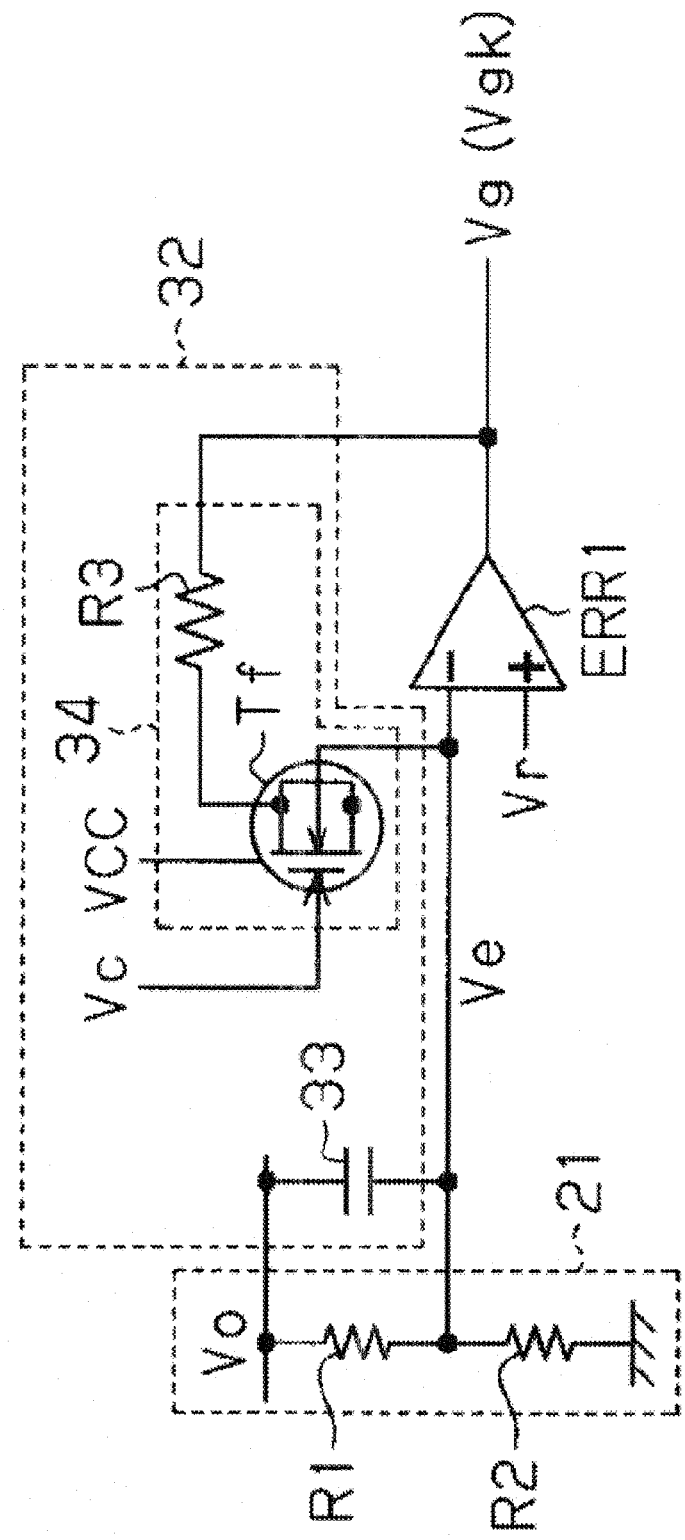
FIG. 3 illustrates a waveform diagram including a characteristic of the DC-DC converter.

The phase compensation unit 32 generates a phase compensation component to a feedback voltage. The phase compensation unit 32 includes a first phase compensation unit 33 and a second phase compensation unit 34. The first phase compensation unit 33 is constituted by a capacitor and is parallel-connected to the first resistor R1. As illustrated in FIG. 3, the second phase compensation unit 34 includes an N-channel floating MOS transistor Tf serving as a variable capacitor in which a back gate thereof is floating from the ground GND, and a third resistor R3.

The back gate of the N-channel floating MOS transistor Tf is connected to the negative input terminal of the error amplifier ERR1 and the source and the drain thereof are both connected to the output terminal of the error amplifier ERR1 via the third resistor R3. The gate of the N-channel floating MOS transistor Tf receives the control voltage Vc from the phase compensation controller 31.

Specifically, the N-channel floating MOS transistor Tf forms a capacitor in a capacitor component (MOS capacitor) between the source and the drain thereof and the back gate thereof. The capacitance value of the MOS capacitor is controlled in accordance with the control voltage Vc input to the gate of the N-channel floating MOS transistor Tf.

In other words, as the voltage value of the control voltage Vc increases (that is, as the voltage difference between the input voltage VCC and the output voltage Vo increases), a depletion layer formed between the source and the drain of the N-channel floating MOS transistor Tf becomes larger, causing the capacitance value of the MOS capacitor to become smaller.

In contrast, as the voltage value of the control voltage Vc decreases (that is, as the voltage difference between the input voltage VCC and the output voltage Vo decreases), the depletion layer formed between the source and the drain of the N-channel floating MOS transistor Tf becomes smaller, causing the capacitance value of the MOS capacitor to become larger.

The capacitance value of the MOS capacitor based on the control voltage Vc is preliminarily set such that an optimal phase compensation constant is set with respect to each input/output condition (voltage difference between the input voltage VCC and the output voltage Vo).

Accordingly, the phase compensator 23 performs phase compensation on the error amplifier ERR1 by changing the capacitance value of the MOS capacitor to an optimal phase compensation constant in accordance with the input/output conditions, that is, the voltage difference between the output voltage Vo and the input voltage VCC at any given time. In consequence, the error amplifier ERR1 minimizes oscillation of the output voltage Vo even in response to a drastic change so as to stably output the error voltage Vg.

Figure 4:
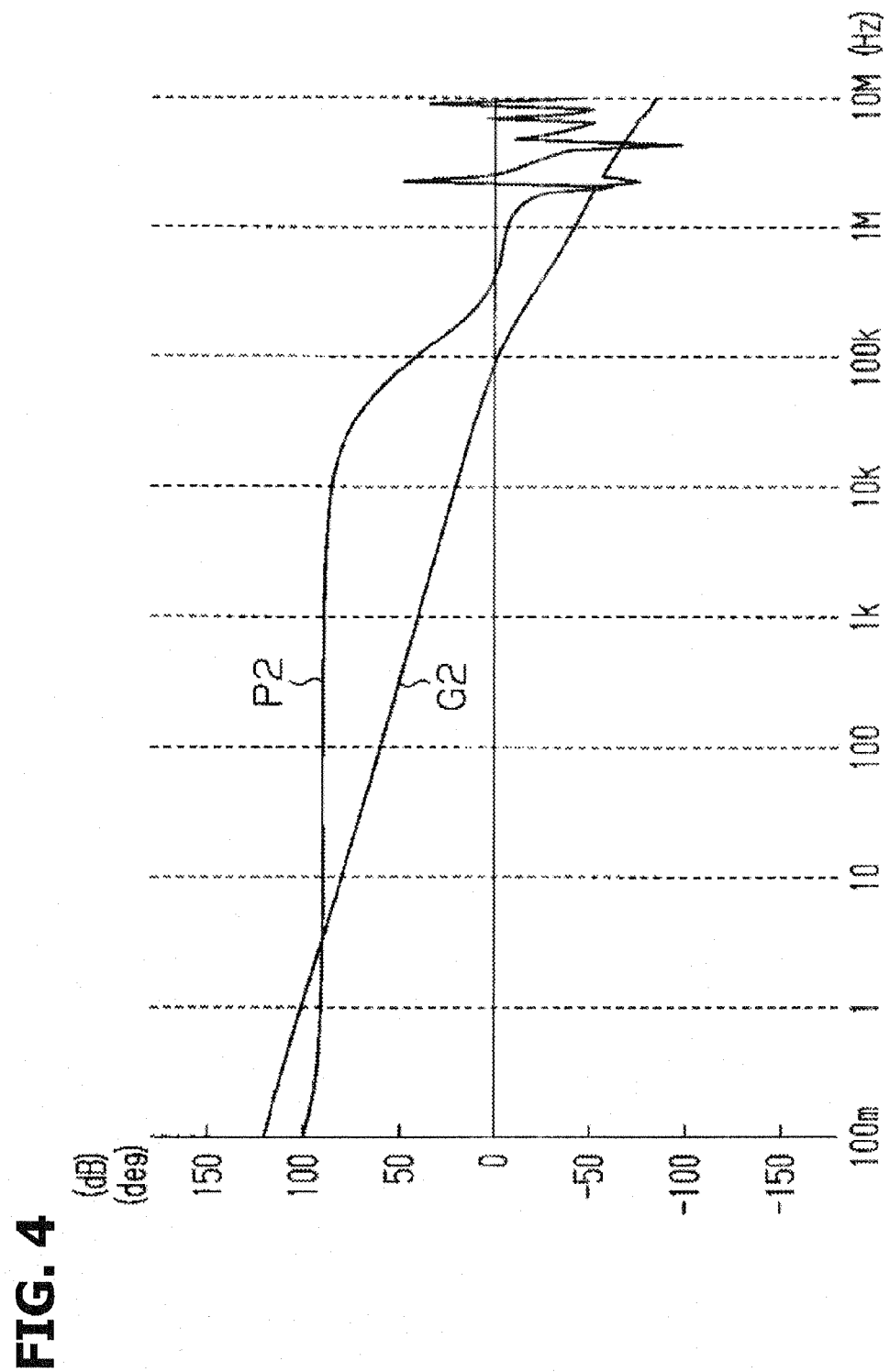
FIG. 4 illustrates a waveform diagram including a characteristic of the DC-DC converter.

FIG. 4 illustrates a simulation result of a frequency characteristic of the DC-DC converter 10 equipped with the phase compensator 23 and shows a gain characteristic line G2 [dB] and a phase characteristic line P2 [dB] of a feedback loop of the DC-DC converter 10. The term "frequency characteristic" in this case refers to a frequency range in which the gain of the DC-DC converter is greater than or equal to 0 dB. Specifically, a frequency characteristic expresses how much the DC-DC converter 10 can still normally operate under a drastic change when the output voltage Vo changes drastically.

The following are input conditions for the simulation: input voltage VCC=3.3 V, output voltage Vo=2.47 V, output current Io to be supplied to the internal circuit 11=450 mA.

As illustrated in FIG. 4, the frequency range of the DC-DC converter 10 equipped with the phase compensator 23 is 97 kHz. When the gain G2 is 0 dB, the phase P2 is 50 degrees or greater. In other words, as compared with the DC-DC converter of the related art illustrated in FIG. 2, it is apparent that there is sufficient phase and the DC-DC converter 10 operates stably without oscillating.

Figure 5:
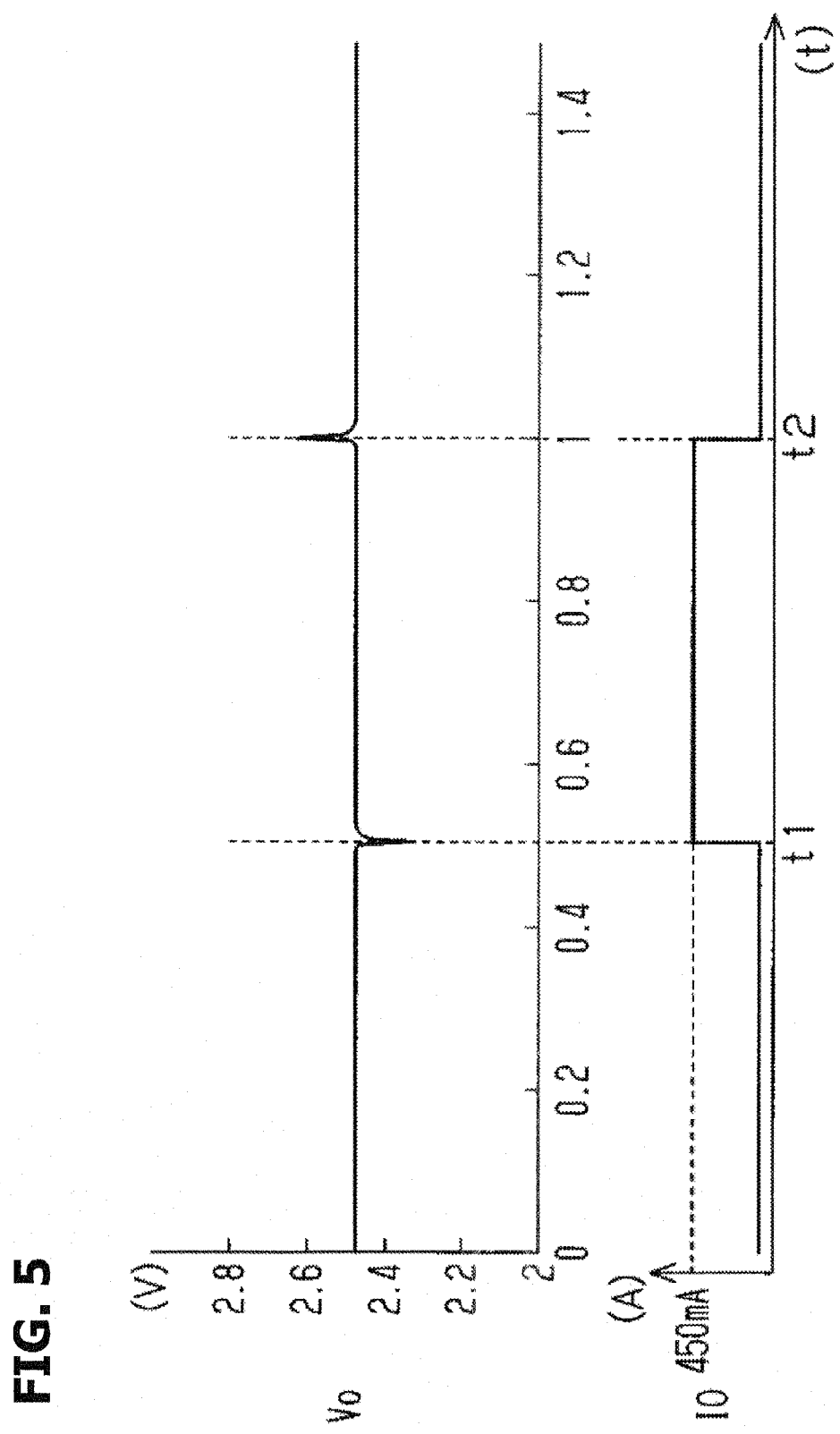
FIG. 5 illustrates a waveform diagram including a characteristic of the DC-DC converter.
Figure 6:
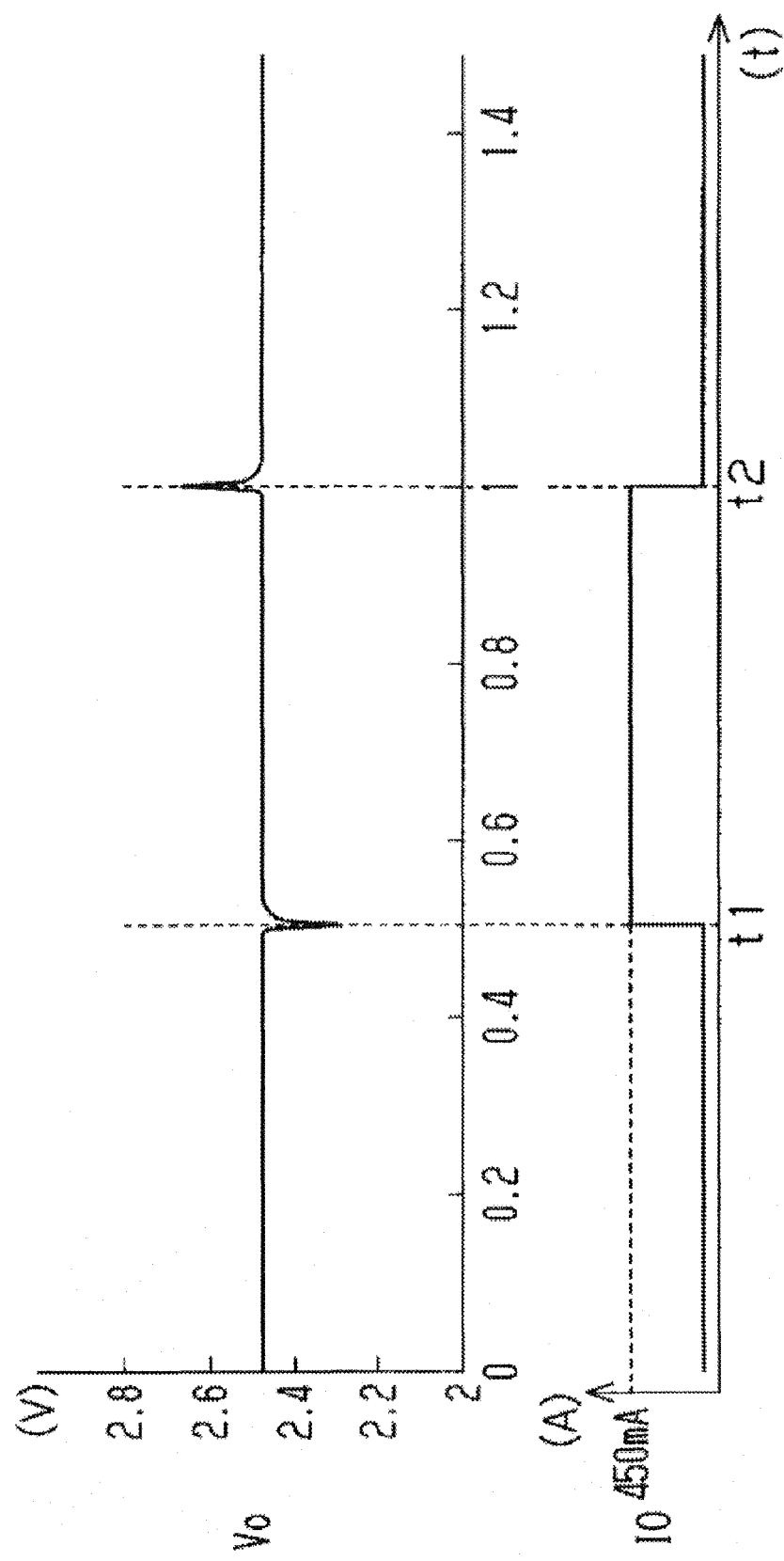
FIG. 6 illustrates a waveform diagram including a characteristic of a DC-DC converter.
Figure 7:
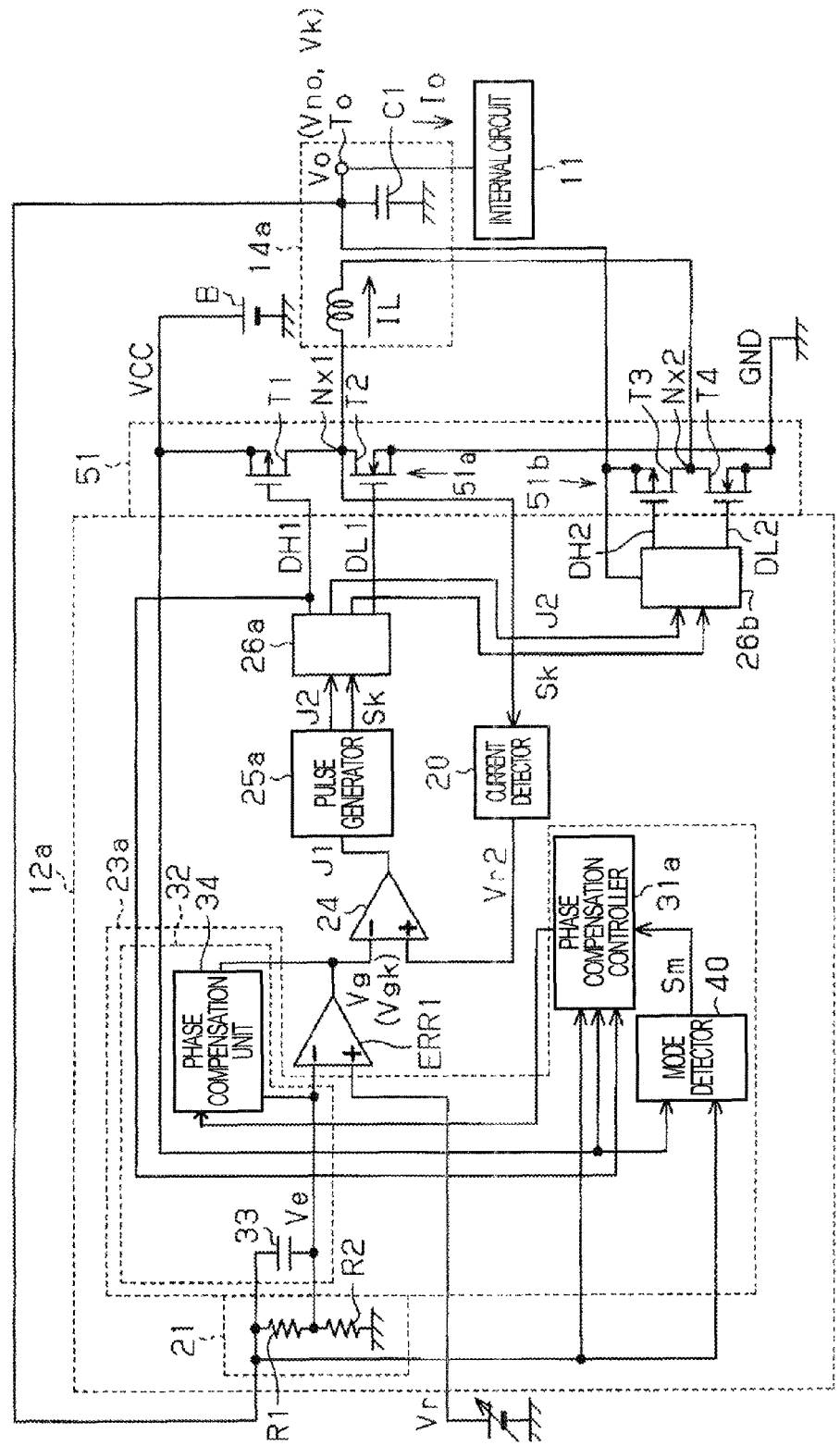
FIG. 7 illustrates an electric block circuit diagram of a DC-DC converter.

FIGS. 5 and 6 illustrate simulation results of a drastic-load-change characteristic of the DC-DC converter 10 equipped with the phase compensator 23 and the DC-DC converter of the related art. The drastic-load-change characteristic expresses a change in the output voltage Vo with respect to a drastic change in the output current Io (average current of the coil current IL).

The following are input conditions for the simulation: input voltage VCC=3.3 V, output voltage Vo=2.47 V. As illustrated in FIGS. 5 and 6, at time t1, the output current Io is first increased from 0 mA to 450 mA in 1 us. Then, at time t2, the output current Io is decreased from 450 mA to 0 mA in 1 us.

As illustrated in FIG. 5, the drastic-load-change characteristic of the DC-DC converter 10 equipped with the phase compensator 23 becomes 140 mV when the output current Io is increased from 0 mA to 450 mA in 1 us at time t1, and becomes 160 mV when the output current Io is decreased from 450 mA to 0 mA in 1 us at time t2.

In contrast, as illustrated in FIG. 6, the drastic-load-change characteristic of the DC-DC converter of the related art becomes 188 mV when the output current Io is increased from 0 mA to 450 mA in 1 us at time t1, and becomes 190 mV when the output current Io is decreased from 450 mA to 0 mA in 1 us at time t2.

In other words, the DC-DC converter 10 equipped with the phase compensator 23 has an improved drastic-load-change characteristic relative to that of the DC-DC converter of the related art.

In consequence, according to the simulation results, since the phase compensation constant of the second phase compensation unit 34 is changed to an optimal phase compensation constant in accordance with the input/output conditions in the DC-DC converter 10 equipped with the phase compensator 23, the frequency characteristic and the drastic-load-change characteristic thereof are improved relative to those of the DC-DC converter of the related art.

As described above, the present embodiment exhibits the following advantages.

(1) The phase compensation controller 31 generates a control voltage Vc according to the input/output conditions. The phase compensation constant of the second phase compensation unit 34 is changed to an optimal phase compensation constant in accordance with the control voltage Vc. Thus, the DC-DC converter 10 can set an optimal phase compensation constant in the entire range of input/output conditions and can stably generate an output voltage Vo.

(2) The phase compensation controller 31 determines a voltage difference between the input voltage VCC and the output voltage Vo and generates a control voltage Vc for changing the phase compensation constant of the second phase compensation unit 34 on the basis of the voltage difference. In consequence, the DC-DC converter 10 can easily calculate an optimal phase compensation constant for the input/output conditions by simply determining the voltage difference between the input voltage VCC and the output voltage Vo.

(3) The second phase compensation unit 34 includes the N-channel floating MOS transistor Tf serving as a variable capacitor. The gate of the N-channel floating MOS transistor Tf receives the control voltage Vc. Thus, with only a simple and small circuit of the N-channel floating MOS transistor Tf, the DC-DC converter 10 can set a capacitance value according to the control voltage Vc so as to obtain an optimal phase compensation constant for the input/output conditions.

In the above embodiment, a so-called step-down DC-DC converter 10 in which a DC-DC converter step-down converts an input voltage VCC to generate an output voltage Vo and outputs it to the internal circuit 11 is equipped with a phase compensator 23. The phase compensator 23 changes the phase compensation constant to an optimal one in accordance with the input/output conditions of the DC-DC converter 10.

In this embodiment, a so-called step-up/step-down DC-DC converter 10a in which the DC-DC converter step-up converts or step-down converts an input voltage VCC to generate an output voltage Vo and outputs it to the internal circuit 11 is equipped with a phase compensator 23a.

The phase compensator 23a changes the phase compensation constant to an optimal one in accordance with the input/output conditions of the DC-DC converter 10a and also in accordance with a mode (generation mode) provided in the DC-DC converter 10a for generating an output voltage Vo from the input voltage VCC. These are the features that differ from those in the first embodiment.

The generation mode provided in the DC-DC converter 10*a* includes a step-down mode, a step-up mode, and a step-up/step-down mode.

A step-down mode is a mode in which the input voltage VCC is step-down converted so as to set the output voltage Vo to a target voltage. In the step-down mode, the input voltage VCC is higher than a first set voltage Vt1 (VCC>Vt1), which is preliminarily set and is slightly higher than (e.g., by 10%) the target voltage Vk.

A step-up mode is a mode in which the input voltage VCC is step-up converted so as to generate an output voltage Vo. In the step-up mode, the output voltage Vo is higher than a second set voltage Vt2 (Vt2>VCC), which is preliminarily set and is slightly lower than (e.g., by 10%) the target voltage Vk.

A step-up/step-down mode is a mode in which the input voltage VCC is step-down converted and step-up converted so as to generate an output voltage Vo. In the step-up/step-down mode, the input voltage VCC is lower than or equal to the first set voltage Vt1 and is higher than or equal to the second set voltage Vt2 (Vt1≥VCC≥Vt2).

In order to correspond to these three modes, a switching circuit 51 is equipped with a step-down switching circuit 51*a* and a step-up switching circuit 51*b*.

The step-down switching circuit 51*a* includes a first transistor T1 formed of a P-channel MOS transistor and a second transistor T2 formed of an N-channel MOS transistor T2. The first transistor T1 receives a first drive signal DH1 to the gate thereof, and the source thereof is supplied with the input voltage VCC. The drain of the first transistor T1 is connected to the drain of the second transistor T2. The second transistor T2 receives a second drive signal DL1 to the gate thereof. The source of the second transistor T2 is connected to ground GND.

The step-up switching circuit 51*b* includes a third transistor T3 formed of a P-channel MOS transistor and a fourth transistor T4 formed of an N-channel MOS transistor. The third transistor T3 receives a first drive signal DH2 to the gate thereof, and the source thereof is supplied with the output voltage Vo. The drain of the third transistor T3 is connected to the drain of the fourth transistor T4. The fourth transistor T4 receives a second drive signal DL2 to the gate thereof. The source of the fourth transistor T4 is connected to ground GND.

In this embodiment, a coil L1 is connected between a connection point (node Nx1) of the first transistor T1 and the second transistor T2 and a connection point (node Nx2) of the third transistor T3 and the fourth transistor T4.

In the switching circuit 51, the first to fourth transistors T1 to 14 of the step-down and step-up switching circuits 51*a* and 51*b* are on/off controlled so that the output voltage Vo is made equal to the target voltage Vk in the step-down mode, the step-up mode, and the step-up/step-down mode.

In the step-down mode (VCC>Vt1), the first transistor T1 and the second transistor T2 of the step-down switching circuit 51*a* are complementarily on/off controlled, the third transistor T3 of the step-up switching circuit 51*b* is constantly turned on, and the fourth transistor T4 is constantly turned off.

In the step-up mode (Vt2>VCC), the third transistor T3 and the fourth transistor T4 of the step-up switching circuit 51*b* are complementarily on/off controlled, the first transistor T1 of the step-down switching circuit 51*a* is constantly turned on, and the second transistor T2 is constantly turned off.

The step-up/step-down mode (Vt1≥VCC≥Vt2) includes state 1 to state 3 obtained by a combination of on/off control of the first transistor T1 to the fourth transistor T4.

In state 1, the control is performed such that the first transistor T1 of the step-down switching circuit 51*a* is turned on, the second transistor T2 is turned off, the third transistor T3 of the step-up switching circuit 51*b* is turned off, and the fourth transistor T4 is turned on.

In state 2, the control is performed such that the first transistor T1 of the step-down switching circuit 51*a* is turned off, the second transistor T2 is turned on, the third transistor T3 of the step-up switching circuit 51*b* is turned on, and the fourth transistor T4 is turned off.

In state 3, the control is performed such that the first transistor T1 of the step-down switching circuit 51*a* is turned on, the second transistor T2 is turned off, the third transistor T3 of the step-up switching circuit 51*b* is turned on, and the fourth transistor T4 is turned off.

State 1 and state 2 constitute a first period operation, and state 1 and state 3 constitute a second period operation. State 1 to state 3 described above are such that state 1 to state 3 are switched from one to another in the following order: state 1, state 2, state 1, state 3, state 1, and so on. The first period and the second period are alternately repeated every time a clock signal of an oscillator in a pulse generator 25*a* is output.

The pulse generator 25*a* distinguishes between the step-down mode, the step-up mode, and the step-up/step-down mode in accordance with the input voltage VCC. Specifically, the pulse generator 25*a* detects the step-down mode when the input voltage VCC is higher than the first set voltage Vt1 (VCC>Vt1) that is slightly higher than (e.g., by 10%) the target voltage Vk. The pulse generator 25*a* detects the step-up mode when the input voltage VCC is lower than the second set voltage Vt2 (Vt2>VCC) that is slightly lower than (e.g., by 10%) the target voltage Vk. The pulse generator 25*a* detects the step-up/step-down mode when the input voltage VCC is lower than or equal to the first set voltage Vt1 and is higher than or equal to the second set voltage Vt2 (Vt1≥VCC≥Vt2).

The pulse generator 25*a* outputs a detection signal Sk for notifying that the detected mode is the step-down mode, the step-up mode, or the step-up/step-down mode to a first feed-through prevention circuit 26*a* and a second feed-through prevention circuit 26*b*.

Specifically, upon detecting the step-down mode, the pulse generator 25*a* outputs a detection signal Sk (step-down signal Sk1) for notifying that the detected mode is the step-down mode. Upon detecting the step-up mode, the pulse generator 25*a* outputs a detection signal Sk (step-up signal Sk2) for notifying that the detected mode is the step-up mode.

Furthermore, when the pulse generator 25*a* is to detect the step-up/step-down mode and a first clock signal is received by the reset terminal of the RS flip-flop circuit from the oscillator circuit, the pulse generator 25*a* outputs a detection signal Sk (first step-up/step-down signal Sk3*a*) for notifying that the detected mode is the step-up/step-down mode and that the detected period is the first period. Subsequently, when a second clock signal is received by the reset terminal of the RS flip-flop circuit from the oscillator circuit, the pulse generator 25*a* outputs a detection signal Sk (second step-up/step-down signal Sk3*b*) for notifying that the detected mode is the step-up/step-down mode and that the detected period is the second period. Then, when a third clock signal is input to the reset terminal of the RS flip-flop circuit from the oscillator circuit, the pulse generator 25*a* outputs a detection signal Sk (first step-up/step-down signal Sk3*a*) for notifying that the detected period is the first period.

Specifically, upon detecting the step-up/step-down mode, the pulse generator 25*a* alternately and repeatedly outputs the first step-up/step-down signal Sk3*a* and the second step-up/step-down signal Sk3*b* every time a clock signal from the oscillator circuit is input to the reset terminal of the RS flip-flop circuit included in the pulse generator 25*a*.

The first feed-through prevention circuit 26a receives the second determination signal J2 and the detection signal Sk from the pulse generator 25a. The second feed-through prevention circuit 26b receives the second determination signal J2 and the detection signal Sk from the pulse generator 25a via the first feed-through prevention circuit 26a.

The first feed-through prevention circuit 26a outputs the first and second drive signals DH1 and DL1 to the step-down switching circuit 51a in accordance with the received second determination signal J2 and detection signal Sk. On the other hand, the second feed-through prevention circuit 26b outputs the first and second drive signals DH2 and DL2 to the step-up switching circuit 51b in accordance with the received second determination signal J2 and detection signal Sk.

Specifically, upon receiving the step-down signal Sk1 (step-down mode), the first feed-through prevention circuit 26a outputs the first and second drive signals DH1 and DL1 respectively to the gates of the first transistor T1 and the second transistor T2 constituting the step-down switching circuit 51a on the basis of the second determination signal J2.

When the second determination signal J2 is at L level, the first feed-through prevention circuit 26a outputs the first and second drive signals DH1 and DL1 at L level to the gates of the first and second transistors T1 and T2. In contrast, when the second determination signal J2 is at H level, the first feed-through prevention circuit 26a outputs the first and second drive signals DH1 and DL1 at H level to the gates of the first and second transistors T1 and T2. Accordingly, the first feed-through prevention circuit 26a outputs the first and second drive signals DH1 and DL1 with the same duty ratio as the second determination signal J2 to the first and second transistors T1 and T2, respectively.

Upon receiving the step-down signal Sk1, the second feed-through prevention circuit 26b constantly outputs the second drive signal DL2 at L level to the gate of the third transistor T3 constituting the step-up switching circuit 51b and constantly outputs the second drive signal DL2 at L level to the gate of the fourth transistor T4.

Subsequently, upon receiving the step-up signal Sk2, the first feed-through prevention circuit 26a constantly outputs the first drive signal DH1 at L level to the gate of the first transistor T1 constituting the step-down switching circuit 51a and constantly outputs the second drive signal DL1 at L level to the gate of the second transistor T2.

Upon receiving the step-up signal Sk2, the second feed-through prevention circuit 26b outputs the first and second drive signals DH2 and DL2 respectively to the gates of the third transistor T3 and the fourth transistor T4 constituting the step-up switching circuit 51b on the basis of the second determination signal J2.

When the second determination signal J2 is at L level, the second feed-through prevention circuit 26b outputs the first and second drive signals DH2 and DL2 at H level to the gates of the third and fourth transistors and T3 and T4. In contrast, when the second determination signal J2 is at H level, the second feed-through prevention circuit 26b outputs the first and second drive signals DH2 and DL2 at L level to the gates of the third and fourth transistors and T3 and T4. Accordingly, the second feed-through prevention circuit 26b outputs the first and second drive signals DH2 and DL2 with the same duty ratio as the second determination signal J2 to the third and fourth transistors and T3 and T4, respectively.

Subsequently, upon receiving the first step-up/step-down signal Sk3a (step-up/step-down mode, first period), the first feed-through prevention circuit 26a outputs the first and second drive signals and DH1 and DL1 respectively to the gates of the first transistor T1 and the second transistor T2 constituting the step-down switching circuit 51a on the basis of the second determination signal J2.

When the second determination signal J2 is at L level, the first feed-through prevention circuit 26a outputs the first and second drive signals DH1 and DL1 at L level to the gates of the first and second transistors T1 and T2. In contrast, when the second determination signal J2 is at H level, the first feed-through prevention circuit 26a outputs the first and second drive signals DH1 and DL1 at H level to the gates of the first and second transistors T1 and T2.

Upon receiving the second step-up/step-down signal Sk3b (step-up/step-down mode, second period), the first feed-through prevention circuit 26a outputs the first and second drive signals DH1 and DL1 at L level to the gates of the first and second transistors T1 and T2 when the second determination signal J2 is at L level and H level.

Specifically, the first feed-through prevention circuit 26a outputs the first and second drive signals DH1 and DL1 at L level without being dependent on the second determination signal J2.

Consequently, in the first period, the first feed-through prevention circuit 26a outputs the first and second drive signals DH1 and DL1 with the same duty ratio as the second determination signal J2 to the first and second transistors T1 and T2, respectively.

In the second period, the first feed-through prevention circuit 26a outputs the first and second drive signals DH1 and DL1 at L level to the first and second transistors T1 and T2, respectively.

Based the second determination signal J2, the second feed-through prevention circuit 26b outputs, upon receiving the first and second step-up/step-down signals Sk3a and Sk3b, the first and second drive signals DH2 and DL2 respectively to the gates of the third transistor T3 and the fourth transistor T4 constituting the step-up switching circuit 51b.

When the second determination signal J2 is at L level, the second feed-through prevention circuit 26b outputs the first and second drive signals DH2 and DL2 at H level to the gates of the third and fourth transistors T3 and T4. In contrast, when the second determination signal J2 is at H level, the second feed-through prevention circuit 26b outputs the first and second drive signals DH2 and DL2 at L level to the gates of the third and fourth transistors T3 and T4. Accordingly, the second feed-through prevention circuit 26b outputs the first and second drive signals DH2 and DL2 with the same duty ratio as the second determination signal J2 to the third and fourth transistors T3 and T4, respectively.

In detail, in the step-down mode (VCC>Vt1), when the load detection voltage Vr2 is smaller than or equal to the error voltage Vg, the first feed-through prevention circuit 26a outputs the first and second drive signals DH1 and DL1 at L level. The second feed-through prevention circuit 26b outputs the first and second drive signals DH2 and DL2 at L level. Thus, the first feed-through prevention circuit 26a causes the first transistor T1 to be turned on and the second transistor T2 to be turned off. The second feed-through prevention circuit 26b causes the third transistor T3 to be turned on and the fourth transistor T4 to be turned off.

In consequence, a current path extending from the input voltage VCC to the output terminal To via the choke coil L1 is formed, and the coil current IL increases as time passes, causing magnetic energy to accumulate in the choke coil L1. Thus, the output voltage Vo gradually increases.

Subsequently, when the load detection voltage Vr2 is greater than the error voltage Vg, the first feed-through prevention circuit 26a outputs the first and second drive signals DH1 and DL1 at H level. The second feed-through prevention circuit 26b outputs the first and second drive signals DH2 and DL2 at L level. Thus, the first feed-through prevention circuit 26a causes the first transistor T1 to be turned off and the second transistor T2 to be turned on. The second feed-through prevention circuit 26b causes the third transistor T3 to be turned on and the fourth transistor T4 to be turned off.

In consequence, a current path extending from the ground GND to the output terminal To via the choke coil L1 is formed, and the coil current IL decreases as time passes, causing the electromagnetic energy accumulated in the choke coil L1 to be released towards the output terminal To. Thus, the output voltage Vo gradually decreases, relative to when the load detection voltage Vr2 is smaller than or equal to the error voltage Vg.

In other words, based on the on/off operation (duty control) of the first transistor T1 and the second transistor T2, the switching circuit 51 outputs the input voltage VCC to the capacitor C1 where a smoothed output voltage Vo is generated and supplied to the internal circuit 11 via the output terminal To.

Specifically, when the output voltage Vo is lower than or equal to the target voltage Vk in the step-down mode (VCC>Vt1), the first feed-through prevention circuit 26a outputs the first and second drive signals DH1 and DL1 with a long L-level time period and causes the first transistor T1 to be turned on and the second transistor T2 to be turned off, so that the output voltage Vo is increased to the target voltage Vk and supplied to the internal circuit 11.

In contrast, when the output voltage Vo is higher than the target voltage Vk, the first feed-through prevention circuit 26a outputs the first and second drive signals DH1 and DL1 with a long H-level time period and causes the first transistor T1 to be turned off and the second transistor T2 to be turned on, so that the output voltage Vo is decreased to the target voltage Vk and supplied to the internal circuit 11.

When the load detection voltage Vr2 is smaller than or equal to the error voltage Vg in the step-up mode (Vt2>VCC), the first feed-through prevention circuit 26a outputs the first and second drive signals DH1 and DL1 at L level. The second feed-through prevention circuit 26b outputs the first and second drive signals DH2 and DL2 at H level. Thus, the first feed-through prevention circuit 26a causes the first transistor T1 to be turned on and the second transistor T2 to be turned off. The second feed-through prevention circuit 26b causes the third transistor T3 to be turned off and the fourth transistor T4 to be turned on.

In consequence, a current path extending from the input voltage VCC to the ground GND via the choke coil L1 is formed, and the coil current IL increases as time passes, causing magnetic energy to accumulate in the choke coil L1. In this case, since the output terminal To is electrically disconnected from the choke coil L1, the output voltage Vo gradually decreases.

Subsequently, when the load detection voltage Vr2 becomes greater than the error voltage Vg, the first feed-through prevention circuit 26a outputs the first and second drive signals DH1 and DL1 at L level. The second feed-through prevention circuit 26b outputs the first and second drive signals DH2 and DL2 at L level. Thus, the first feed-through prevention circuit 26a causes the first transistor T1 to be turned on and the second transistor T2 to be turned off. The second feed-through prevention circuit 26b causes the third transistor T3 to be turned on and the fourth transistor T4 to be turned off.

In consequence, a current path extending from the input voltage VCC to the output terminal To via the choke coil L1 is formed, and the electric potential at the node Nx1 side of the choke coil L1 maintains the input voltage VCC, causing the electromagnetic energy accumulated in the choke coil L1 to be released towards the output terminal To. Thus, in addition to the input voltage VCC, the output voltage Vo increases by an amount equivalent to the electromagnetic energy accumulated in the choke coil L1.

In other words, based on the on/off operation (duty control) of the third transistor T3 and the fourth transistor T4, the switching circuit 51 outputs the input voltage VCC to the capacitor C1 where a smoothed output voltage Vo is generated and supplied to the internal circuit 11 via the output terminal To.

Specifically, when the output voltage Vo is lower than or equal to the target voltage Vk in the step-up mode (Vt2>VCC), the second feed-through prevention circuit 26b outputs the first and second drive signals DH2 and DL2 with a long H-level time period and causes the third transistor T3 to be turned off and the fourth transistor T4 to be turned on, so that the output voltage Vo is increased to the target voltage Vk and supplied to the internal circuit 11.

In contrast, when the output voltage Vo is higher than the target voltage Vk, the second feed-through prevention circuit 26b outputs the first and second drive signals DH2 and DL2 with a long L-level time period and causes the third transistor T3 to be turned on and the second transistor T2 to be turned off, so that the output voltage Vo is decreased to the target voltage Vk and supplied to the internal circuit 11.

Furthermore, if the first step-up/step-down signal Sk3a is to be received (first period) in the step-up/step-down mode (Vt1≥VCC≥Vt2), when the load detection voltage Vr2 is smaller than or equal to the error voltage Vg, the first feed-through prevention circuit 26a first outputs the first and second drive signals DH1 and DL1 at L level. The second feed-through prevention circuit 26b outputs the first and second drive signals DH2 and DL2 at H level. Thus, the first feed-through prevention circuit 26a causes the first transistor T1 to be turned on and the second transistor T2 to be turned off. The second feed-through prevention circuit 26b causes the third transistor T3 to be turned off and the fourth transistor T4 to be turned on. In other words, the switching circuit 51 is in state 1.

In consequence, a current path extending from the input voltage VCC to the ground GND via the choke coil L1 is formed, and the coil current IL increases as time passes, causing magnetic energy to accumulate in the choke coil L1. In this case, since the output terminal To is electrically disconnected from the choke coil L1, the output voltage Vo gradually decreases.

Subsequently, when the load detection voltage Vr2 becomes greater than the error voltage Vg, the first feed-through prevention circuit 26a outputs the first and second drive signals DH1 and DL1 at H level. The second feed-through prevention circuit 26b outputs the first and second drive signals DH2 and DL2 at L level. Thus, the first feed-through prevention circuit 26a causes the first transistor T1 to be turned off and the second transistor T2 to be turned on. The second feed-through prevention circuit 26b causes the third transistor T3 to be turned on and the fourth transistor T4 to be turned off. In other words, the switching circuit 51 is in state 2.

In consequence, a current path extending from the ground GND to the output terminal To via the choke coil L1 is formed, and the coil current IL decreases as time passes, causing the electromagnetic energy accumulated in the choke coil L1 to be released towards the output terminal To. Thus, the output voltage Vo gradually increases.

Subsequently, if the second step-up/step-down signal Sk3*b* is to be received (second period), when the load detection voltage Vr2 is smaller than or equal to the error voltage Vg, the first feed-through prevention circuit 26*a* outputs the first and second drive signals DH1 and DL1 at L level. The second feed-through prevention circuit 26*b* outputs the first and second drive signals DH2 and DL2 at H level. Thus, the first feed-through prevention circuit 26*a* causes the first transistor T1 to be turned on and the second transistor T2 to be turned off. The second feed-through prevention circuit 26*b* causes the third transistor T3 to be turned off and the fourth transistor T4 to be turned on. In other words, the switching circuit 51 is in state 1.

In consequence, a current path extending from the input voltage VCC to the ground GND via the choke coil L1 is formed, and the coil current IL increases as time passes, causing magnetic energy to accumulate in the choke coil L1. In this case, since the output terminal To is electrically disconnected from the choke coil L1, the output voltage Vo gradually decreases.

Subsequently, when the load detection voltage Vr2 becomes greater than the error voltage Vg, the first feed-through prevention circuit 26*a* outputs the first and second drive signals DH1 and DL1 at L level. The second feed-through prevention circuit 26*b* outputs the first and second drive signals DH2 and DL2 at L level. Thus, the first feed-through prevention circuit 26*a* causes the first transistor T1 to be turned on and the second transistor T2 to be turned off. The second feed-through prevention circuit 26*b* causes the third transistor T3 to be turned on and the fourth transistor T4 to be turned off. In other words, the switching circuit 51 is in state 3.

In consequence, a current path extending from the input voltage VCC to the output terminal To via the choke coil L1 is formed, and the electric potential at the node Nx1 side of the choke coil L1 maintains the input voltage VCC, causing the electromagnetic energy accumulated in the choke coil L1 to be released towards the output terminal To. Thus, in addition to the input voltage VCC, the output voltage Vo increases by an amount equivalent to the electromagnetic energy accumulated in the choke coil L1.

When the switching circuit 51 is in state 3 and the input voltage VCC is close to the output voltage Vo, the coil current IL hardly flows and electromagnetic energy does not accumulate in the choke coil L1. Thus, the output voltage Vo maintains the voltage value in that state.

In other words, based on the on/off operation of the first to fourth switching T1 to T4, state 1 and state 2 constituting the first period and state 1 and state 3 constituting the second period are duty-controlled, and the switching circuit 51 outputs the input voltage VCC to the capacitor C1 where a smoothed output voltage Vo is generated and supplied to the internal circuit 11 via the output terminal To.

Specifically, when the output voltage Vo is lower than or equal to the target voltage Vk in the step-up/step-down mode (Vt1≥VCC≥Vt2), the first feed-through prevention circuit 26*a* outputs the first and second drive signals DH1 and DL1 with a long L-level time period and the second feed-through prevention circuit 26*b* outputs the first and second drive signals DH2 and DL2 with a long H-level time period during the first and second periods. The switching circuit 51 is thus set to state 1, and the output voltage Vo is increased to the target voltage Vk and supplied to the internal circuit 11.

In contrast, when the output voltage Vo is higher than the target voltage Vk, the first feed-through prevention circuit 26*a* outputs the first and second drive signals DH1 and DL1 with a long H-level time period and the second feed-through prevention circuit 26*b* outputs the first and second drive signals DH2 and DL2 with a long L-level time period during the first period. The switching circuit 51 is thus set to state 2, and the output voltage Vo is decreased to the target voltage Vk and supplied to the internal circuit 11.

When the output voltage Vo is higher than the target voltage Vk, the first feed-through prevention circuit 26*a* outputs the first and second drive signals DH1 and DL1 with a long L-level time period and the second feed-through prevention circuit 26*b* outputs the first and second drive signals DH2 and DL2 with a long L-level time period during the second period. The switching circuit 51 is thus set to state 3, and the output voltage Vo is decreased to the target voltage Vk and supplied to the internal circuit 11.

The control circuit 12 of the DC-DC converter 10*a* having the above-described configuration is provided with the phase compensator 23*a*. Like the first embodiment, the phase compensator 23*a* is for preventing the output voltage Vo from oscillating in response to a drastic change in the output voltage Vo.

Figure 8:
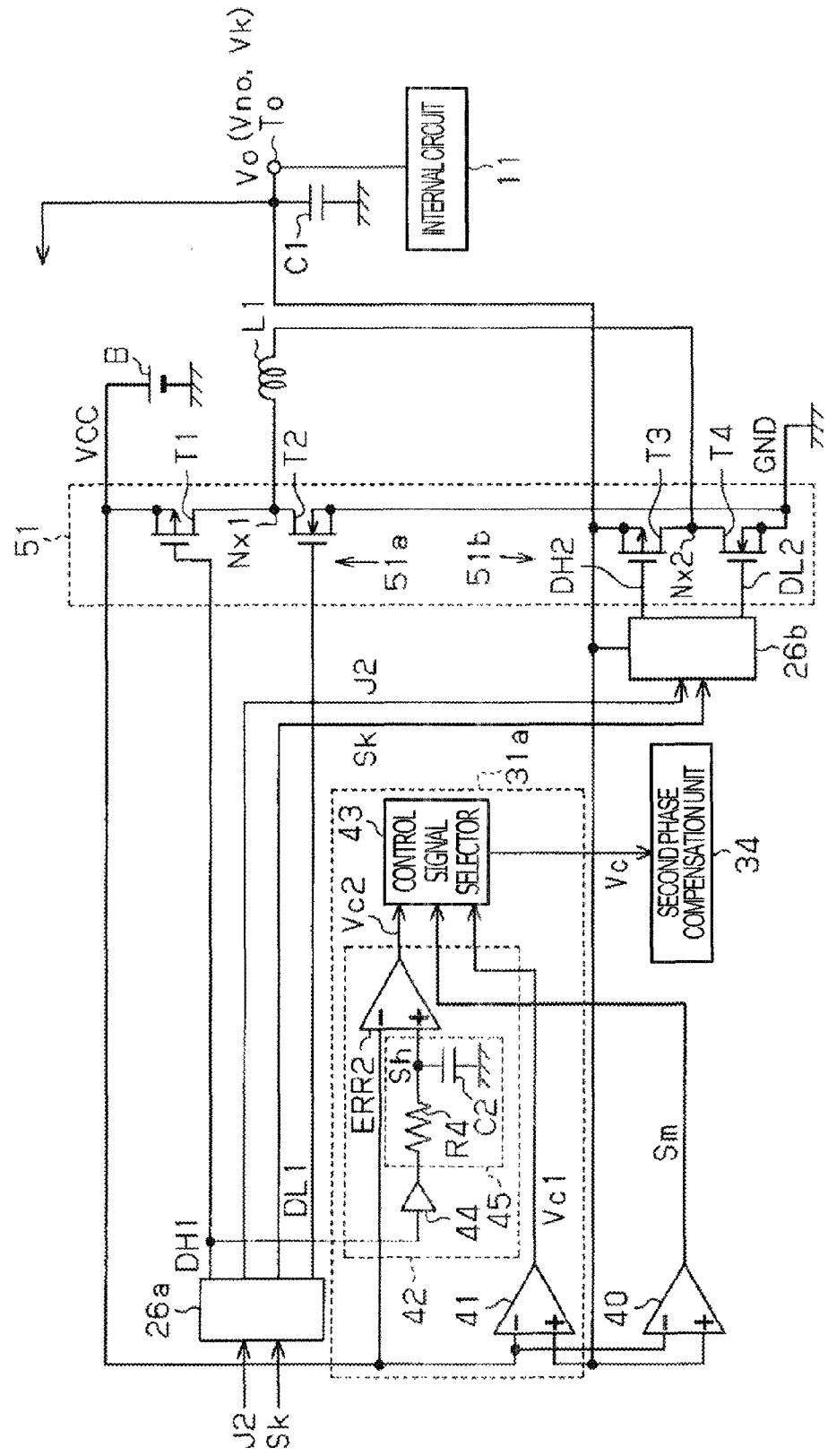
FIG. 8 illustrates an electric block circuit diagram of a phase compensator.

FIG. 8 illustrates an electric block circuit for explaining a mode detecting circuit 40 and a phase compensation controller 31*a*.

The mode detecting circuit 40 is a comparator circuit that receives the input voltage VCC to a negative input terminal thereof and receives the output voltage Vo to a positive input terminal thereof. The mode detecting circuit 40 compares the received input voltage VCC and output voltage Vo and outputs a mode detection signal Sm to the phase compensation controller 31*a* in accordance with the comparison result. In other words, when the output voltage Vo is lower than the input voltage VCC, the mode detecting circuit 40 outputs the mode detection signal Sm at L level for selecting the aforementioned step-up mode.

In contrast, when the output voltage Vo is higher than or equal to the input voltage VCC, the mode detecting circuit 40 outputs the mode detection signal Sm at H level for selecting the aforementioned step-up mode and step-up/step-down mode. The mode detecting circuit 40 is provided with a hysteresis for preventing a malfunction from occurring near the switching between the H level and the L level of the mode detection signal Sm.

The phase compensation controller 31*a* includes a first control circuit 41, a second control circuit 42, and a control signal selector 43.

In the aforementioned step-down mode, the first control circuit 41 generates a first control voltage Vc1 that changes the phase compensation constant to an optimal one in accordance with the input/output conditions.

The first control circuit 41 is an error amplifier that receives the input voltage VCC to a negative input terminal thereof and receives the output voltage Vo to a positive input terminal thereof. The first control circuit 41 amplifies a voltage difference between the received input voltage VCC and output voltage Vo and outputs it as a first control voltage Vc1.

In the step-up mode and the step-up/step-down mode, the second control circuit 42 generates a second control voltage Vc2 that changes the phase compensation constant to an optimal one in accordance with the input/output conditions.

The second control circuit 42 includes a buffer circuit 44, a second smoothing circuit 45, and an error amplifier ERR2. The buffer circuit 44 receives the first drive signal DH1 from the first feed-through prevention circuit 26*a*. As mentioned above, the first drive signal DH1 maintains the H-level state in the step-up mode and switches between the H level and the L level in the step-up mode and the step-up/step-down mode.

The buffer circuit 44 increases the drive capability of the received first drive signal DH1 and outputs it to the second smoothing circuit 45.

The second smoothing circuit 45 is formed of a fourth resistor R4 and a capacitor C2 and receives the first drive signal DH1 from the buffer circuit 44. The second smoothing circuit 45 smoothes the received first drive signal DH1 and outputs the smoothed first drive signal DH1 as a comparison signal Sh to the error amplifier ERR2. In other words, in the step-down mode and the step-up/step-down mode, the second smoothing circuit 45 smoothes the received first drive signal DH1 that switches between the H level and the L level.

Accordingly, as mentioned above, the first drive signal DH1 in the step-down mode and the step-up/step-down mode is smoothed and set to a voltage lower than the H level (input voltage VCC). On the other hand, the first drive signal DH1 in the step-up mode maintains the H level (input voltage VCC).

The error amplifier ERR2 receives the input voltage VCC to a negative input terminal thereof and receives the comparison signal Sh to a positive input terminal thereof. The error amplifier ERR2 amplifies a voltage difference between the received input voltage VCC and comparison signal Sh and outputs it as a second control voltage Vc2.

In other words, based on whether the switching between the H level and the L level is performed, which corresponds to the difference between the first drive signal DH1 in the step-up mode and the first drive signal DH1 in the step-down mode and the step-up/step-down mode, the second control circuit 42 reduces the electric potential of the comparison signal Sh in the step-down mode and the step-up/step-down mode relative to that of the comparison signal Sh in the step-up mode. Therefore, in the step-up mode, the second control circuit 42 uses a high voltage region of the second control voltage Vc2. In the step-down mode and the step-up/step-down mode, the second control circuit 42 uses a low voltage region of the second control voltage Vc2.

The control signal selector 43 is constituted by an analog switch and receives the first control voltage Vc1 from the first control circuit 41, the second control voltage Vc2 from the second control circuit 42, and the mode detection signal Sm from the mode detecting circuit 40. The control signal selector 43 selects one of the received first control voltage Vc1 and second control voltage Vc2 in accordance with the received mode detection signal Sm and outputs it to the second phase compensation unit 34.

Specifically, upon receiving the mode detection signal Sm at L level (step-down mode), the control signal selector 43 selects the first control voltage Vc1 and outputs the first control voltage Vc1 as a control voltage Vc to the second phase compensation unit 34 (the gate of the N-channel floating MOS transistor Tf). In contrast, upon receiving the mode detection signal Sm at H level (step-up mode or step-up/step-down mode), the control signal selector 43 selects the second control voltage Vc2 and outputs the second control voltage Vc2 as a control voltage Vc to the second phase compensation unit 34 (the gate of the N-channel floating MOS transistor Tf). In this case, the control signal selector 43 outputs the second control voltage Vc2 (control voltage Vc) that uses the high voltage region during the step-up mode, and outputs the second control voltage Vc2 (control voltage Vc) that uses the low voltage region during the step-up/step-down mode.

Accordingly, in the phase compensator 23a, the phase compensation constant is changed to an optimal one in accordance with the generation mode and the input/output conditions.

As described above, the present embodiment exhibits the following advantages.

(1) The mode detecting circuit 40 detects the generation mode and outputs the mode detection signal Sm to the phase compensation controller 31a. The phase compensation controller 31a switches between the first and second control voltages Vc1 and Vc2 in accordance with the mode detection signal Sm and outputs it to the second phase compensation unit 34. Thus, in each generation mode, the DC-DC converter 10a can set an optimal phase compensation constant in the entire range of input/output conditions by using a simple configuration and can stably generate an output voltage Vo.

The above embodiments can alternatively be implemented by the following embodiments.

Figure 9A:
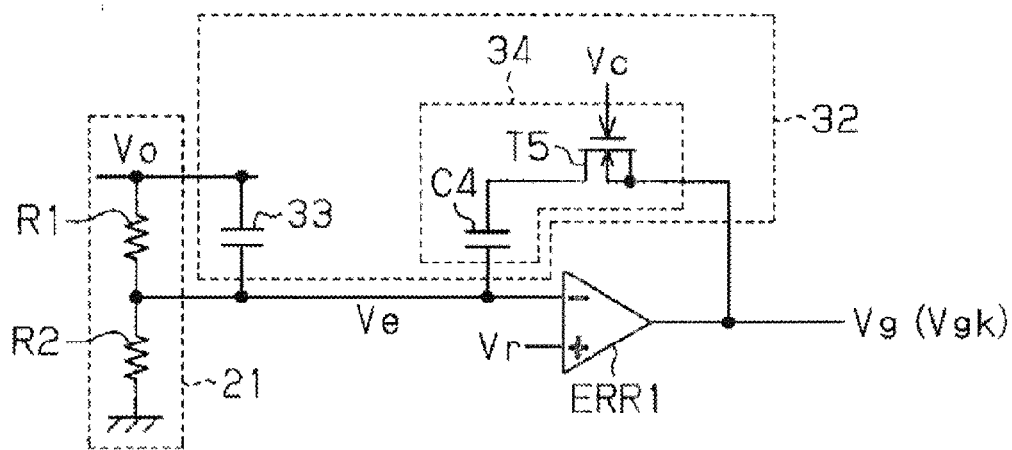
FIG. 9A illustrates an electric circuit diagram of a phase compensation unit.

In the above embodiments, the second phase compensation unit 34 is equipped with the N-channel floating MOS transistor Tf and the third resistor R3, as illustrated in FIG. 9A. Alternatively, the N-channel floating MOS transistor Tf may be changed to a capacitor C4, and the third resistor R3 may be changed to an N-channel MOS transistor T5 serving as a variable resistor.

The drain of the N-channel MOS transistor T5 is connected to the capacitor C4, and the source thereof is connected to the output terminal of the error amplifier ERR1. The N-channel MOS transistor T5 receives the control voltage Vc to the gate thereof. Thus, the N-channel MOS transistor T5 can change its ON resistance in accordance with the received control voltage Vc. Accordingly, similar to the above embodiments, the phase compensation constant can be changed in accordance with the control voltage Vc.

Figure 9B:
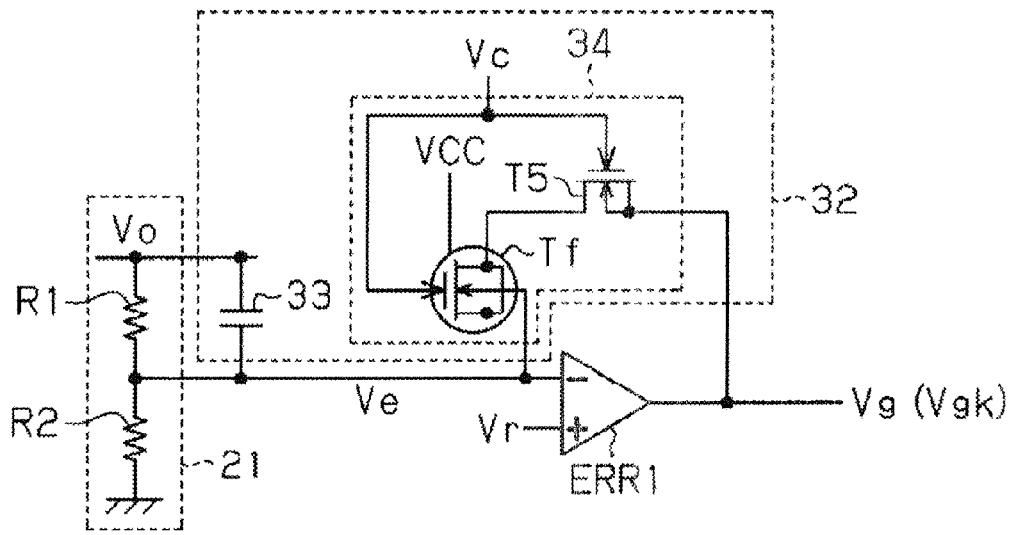
FIG. 9B illustrates an electric circuit diagram of a phase compensation unit.

In the above embodiments, the second phase compensation unit 34 is equipped with the N-channel floating MOS transistor Tf and the third resistor R3, as illustrated in FIG. 9B. Alternatively, the third resistor R3 may be changed to an N-channel MOS transistor T5.

The drain of the N-channel MOS transistor T5 is connected to the capacitor C4, and the source thereof is connected to the output terminal of the error amplifier ERR1. The N-channel MOS transistor T5 receives the control voltage Vc to the gate thereof. Thus, the N-channel MOS transistor T5 can change its ON resistance in accordance with the received control voltage Vc. Accordingly, similar to the above embodiments, the phase compensation constant can be changed in accordance with the control voltage Vc, and a change in the phase compensation constant with respect to the control voltage Vc becomes greater than that in the above embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A DC-DC converter for generating an output voltage from an input voltage, comprising:
   an output stage to output the output voltage generated based on the input voltage;
   an error amplifier having an input for receiving a feedback voltage in accordance with the output voltage, a first input for receiving a reference voltage and an output for generating an amplified voltage which drives the output stage, the amplified voltage corresponding to the difference between the feedback voltage and the reference voltage;

a phase compensation circuit to adjust a phase of the feedback voltage; and a phase compensation controller to control a phase compensation component of the phase compensation circuit based on the input voltage and the output voltage, wherein the phase compensation circuit includes a variable capacitor having a transistor whose backgate is coupled to a second input of the error amplifier, wherein a capacitance of the variable capacitor is controlled based on a control voltage so as to become small when the control voltage becomes large and to become large when the control voltage becomes small, wherein the control voltage is generated by amplifying a voltage difference between the input voltage and the output voltage.

2. The DC-DC converter of claim 1, wherein the phase compensation circuit is a serial circuit including the variable capacitor and a resistor electrically connected between the input and the output, and wherein the phase compensation controller controls capacitance of the variable capacitor.

3. The DC-DC converter of claim 1, wherein the phase compensation circuit is a serial circuit including the variable capacitor and a resistor electrically connected between the input and the output, and wherein the phase compensation controller controls capacitance of the variable capacitor.

4. The DC-DC converter of claim 2, wherein the transistor is an N-channel floating MOS transistor including a gate of the N-channel MOS transistor receiving a control signal from the phase compensation controller.

5. The DC-DC converter of claim 3, wherein the transistor is an N-channel floating MOS transistor including a gate of the N-channel MOS transistor receiving a control signal from the phase compensation controller.

6. The DC-DC converter of claim 1, wherein the phase compensation circuit is a serial circuit including the variable capacitor and a variable resistor electrically connected between the input and the output, and wherein the phase compensation controller controls resistance of the variable resistor.

7. The DC-DC converter of claim 1, wherein the phase compensation circuit is a serial circuit including the variable capacitor and a variable resistor electrically connected between the input and the output, and wherein the phase compensation controller controls resistance of the variable resistor.

8. The DC-DC converter of claim 6, wherein the variable resistor is an N-channel MOS transistor, a gate of the N-channel MOS transistor receiving a control signal from the phase compensation controller, a drain of the N-channel MOS transistor electrically connecting to the output, a source of the N-channel MOS transistor electrically connecting to the input.

9. The DC-DC converter of claim 7, wherein the variable resistor is an N-channel MOS transistor, a gate of the N-channel MOS transistor receiving a control signal from the phase compensation controller, a drain of the N-channel MOS transistor electrically connecting to the output, a source of the N-channel MOS transistor electrically connecting to the input.

10. The DC-DC converter of claim 1, wherein the phase compensation circuit is a serial circuit including the variable capacitor and a variable resistor electrically connected between the input and the output, and wherein the phase compensation controller controls capacitance of the variable capacitor.

11. The DC-DC converter of claim 1, wherein the phase compensation circuit is a serial circuit including the variable capacitor and a variable resistor electrically connected between the input and the output, and wherein the phase compensation controller controls and capacitance of the variable capacitor.

12. The DC-DC converter of claim 10, wherein the variable capacitor is an N-channel MOS transistor, the gate of the N-channel MOS transistor receiving a control signal from the phase compensation controller, and wherein the variable resistor is an N-channel MOS transistor, the gate of the N-channel MOS transistor receiving the control signal from the phase compensation controller.

13. The DC-DC converter of claim 10, wherein the variable capacitor is an N-channel MOS transistor, the gate of the N-channel MOS transistor receiving a control signal from the phase compensation controller, and wherein the variable resistor is an N-channel MOS transistor, the gate of the N-channel MOS transistor receiving the control signal from the phase compensation controller.

14. The DC-DC converter of claim 4, wherein the phase compensation controller generates a difference voltage between the feedback voltage and the input voltage and wherein the phase compensation controller outputs the control signal in accordance with the difference voltage to the gate of the each N-channel MOS transistor.

15. The DC-DC converter of claim 5, wherein the phase compensation controller generates a difference voltage between the feedback voltage and the input voltage and wherein the phase compensation controller outputs the control signal in accordance with the difference voltage to the gate of the each N-channel MOS transistor.

16. The DC-DC converter of claim 8, wherein the phase compensation controller generates a difference voltage between the feedback voltage and the input voltage and wherein the phase compensation controller outputs the control signal in accordance with the difference voltage to the gate of the each N-channel MOS transistor.

17. The DC-DC converter of claim 9, wherein the phase compensation controller generates a difference voltage between the feedback voltage and the input voltage and wherein the phase compensation controller outputs the control signal in accordance with the difference voltage to the gate of the each N-channel MOS transistor.

18. The DC-DC converter of claim 12, wherein the phase compensation controller generates a difference voltage between the feedback voltage and the input voltage and wherein the phase compensation controller outputs the control signal in accordance with the difference voltage to the gate of the each N-channel MOS transistor.

19. The DC-DC converter of claim 13, wherein the phase compensation controller generates a difference voltage between the feedback voltage and the input voltage and wherein the phase compensation controller outputs the control signal in accordance with the difference voltage to the gate of the each N-channel MOS transistor.

20. The DC-DC converter of claim 13, wherein the phase compensation circuit includes a resistor coupled to a source and a drain of the transistor.

* * * * *